US009893373B2

(12) United States Patent
Yandrasits et al.

(10) Patent No.: US 9,893,373 B2
(45) Date of Patent: Feb. 13, 2018

(54) REINFORCED ELECTROLYTE MEMBRANE

(75) Inventors: Michael Andrew Yandrasits, Hastings, MN (US); Ji-Hwa Lee, Gyeonggi-do (KR); Youngdon Yi, KyeongGi-Do (KR); Daniel McGregor Pierpont, North St. Paul, MN (US); Steven Joseph Hamrock, Stillwater, MN (US); Mark Albert Schonewill, Bloomington, MN (US)

(73) Assignee: 3M Innovative Properties Company, St. Paul, MN (US)

(*) Notice: Subject to any disclaimer, the term of this patent is extended or adjusted under 35 U.S.C. 154(b) by 663 days.

(21) Appl. No.: 13/699,210

(22) PCT Filed: May 18, 2011

(86) PCT No.: PCT/US2011/036935
§ 371 (c)(1),
(2), (4) Date: Jan. 10, 2013

(87) PCT Pub. No.: WO2011/149732
PCT Pub. Date: Dec. 1, 2011

(65) Prior Publication Data
US 2013/0101918 A1 Apr. 25, 2013

Related U.S. Application Data

(60) Provisional application No. 61/348,086, filed on May 25, 2010.

(51) Int. Cl.
H01M 8/1053 (2016.01)
H01M 8/1023 (2016.01)
(Continued)

(52) U.S. Cl.
CPC ......... *H01M 8/1053* (2013.01); *C08J 5/2206* (2013.01); *H01M 8/106* (2013.01);
(Continued)

(58) Field of Classification Search
CPC .................................................. H01M 8/1053
See application file for complete search history.

(56) References Cited

U.S. PATENT DOCUMENTS 6,090,895 A 7/2000 Mao
6,254,978 B1 7/2001 Bahar
(Continued)

FOREIGN PATENT DOCUMENTS

EP    2 254 181    3/2011
JP    2001-514431  3/2001
(Continued)

OTHER PUBLICATIONS

Choi, "Nanofiber Network Ion-Exchange Membranes", *Macromolecules*, vol. 41, pp. 4569-4572 (2008).
(Continued)

*Primary Examiner* — Sarah A Slifka
(74) *Attorney, Agent, or Firm* — Julie Lapos-Kuchar; Stephen Crooks

(57) ABSTRACT

An electrolyte membrane having a proton conducting polymer reinforced with a nanofiber mat made from a nanofiber comprising a fiber material selected from polymers and polymer blends; wherein the fiber material has a fiber material proton conductivity; wherein the proton conducting polymer has a proton conducting polymer conductivity; and wherein the fiber material proton conductivity is less than the proton conducting polymer conductivity, and methods of making. In some embodiments, the nanofiber further comprises a proton conducting polymer.

19 Claims, 5 Drawing Sheets

(51) Int. Cl.
  *H01M 8/1039*  (2016.01)
  *H01M 8/1051*  (2016.01)
  *H01M 8/106*   (2016.01)
  *H01M 8/1062*  (2016.01)
  *H01M 8/1067*  (2016.01)
  *H01M 8/1069*  (2016.01)
  *H01M 8/1081*  (2016.01)
  *C08J 5/22*    (2006.01)

(52) U.S. Cl.
  CPC ....... *H01M 8/1023* (2013.01); *H01M 8/1039* (2013.01); *H01M 8/1051* (2013.01); *H01M 8/1062* (2013.01); *H01M 8/1067* (2013.01); *H01M 8/1069* (2013.01); *H01M 8/1081* (2013.01); *C08J 2327/16* (2013.01); *H01M 2300/0082* (2013.01); *H01M 2300/0094* (2013.01); *Y02P 70/56* (2015.11)

(56) References Cited

U.S. PATENT DOCUMENTS

| | | |
|---|---|---|
| RE37,307 E | 8/2001 | Bahar |
| 6,727,386 B2 | 4/2004 | Hamrock |
| 6,863,838 B2 | 3/2005 | Hamrock |
| 7,060,738 B2 | 6/2006 | Jing |
| 7,060,756 B2 | 6/2006 | Jing |
| 7,074,841 B2 | 7/2006 | Yandrasits |
| 7,112,614 B2 | 9/2006 | Jing |
| 7,173,067 B2 | 2/2007 | Guerra |
| 7,179,847 B2 | 2/2007 | Yandrasits |
| 7,259,208 B2 | 8/2007 | Guerra |
| 7,265,162 B2 | 9/2007 | Yandrasits |
| 7,285,349 B2 | 10/2007 | Hamrock |
| 7,311,989 B2 | 12/2007 | Hommura |
| 7,326,737 B2 | 2/2008 | Guerra |
| 7,348,088 B2 | 3/2008 | Hamrock |
| 7,411,022 B2 | 8/2008 | Guerra |
| 7,435,498 B2 | 10/2008 | Yandrasits |
| 7,514,481 B2 | 4/2009 | Yandrasits |
| 7,569,616 B2 | 8/2009 | Kotera |
| 7,572,534 B2 | 8/2009 | Frey |
| 7,622,217 B2 | 11/2009 | Debe |
| 7,709,139 B2 | 5/2010 | White |
| 2002/0100725 A1 | 8/2002 | Lee |
| 2006/0014887 A1 | 1/2006 | Hamrock |
| 2006/0105215 A1* | 5/2006 | Panambur et al. ............. 429/30 |
| 2007/0082814 A1 | 4/2007 | Debe |
| 2007/0099051 A1* | 5/2007 | Hocevar ................ C08J 5/2237 429/492 |
| 2007/0099052 A1 | 5/2007 | Frey |
| 2007/0099053 A1 | 5/2007 | Frey |
| 2007/0128425 A1* | 6/2007 | Hadj Romdhane ......... B01D 67/0009 428/304.4 |
| 2008/0113242 A1 | 5/2008 | Smith |
| 2008/0248362 A1 | 10/2008 | Sayre |
| 2009/0047515 A1 | 2/2009 | Kohinata et al. |
| 2009/0169959 A1 | 7/2009 | Pierpont |
| 2009/0208809 A1 | 8/2009 | Hamrock |
| 2009/0239123 A1 | 9/2009 | Kotera |
| 2010/0047668 A1 | 2/2010 | Steinbach |
| 2010/0062314 A1 | 3/2010 | Frey |
| 2011/0200907 A1* | 8/2011 | Moon ................... H01B 1/122 429/455 |
| 2013/0029249 A1 | 1/2013 | Hamrock |

FOREIGN PATENT DOCUMENTS

| | | |
|---|---|---|
| JP | 2003-528420 | 9/2003 |
| JP | 2003-297393 | 10/2003 |
| JP | 2007-083467 | 9/2005 |
| JP | 2008-238134 A | 10/2008 |
| JP | 2008-308810 | 12/2008 |
| JP | 2009-245639 | 10/2009 |
| KR | 2009/0039180 | 4/2009 |
| WO | WO 99/10165 | 3/1999 |
| WO | WO 00/22684 | 4/2000 |
| WO | WO 2005/05770 | 6/2005 |
| WO | WO 2007/034233 | 3/2007 |
| WO | WO-2009145570 * | 12/2009 ............. H01M 4/86 |
| WO | WO 2012/099582 | 7/2012 |

OTHER PUBLICATIONS

Choi, "Nafion-impregnated electrospun polyvinylidene fluoride composite membranes for direct methoanol fule cells", *Journal of Power Sources*, vol. 180, pp. 167-171 (2008).

Choi, "Composite Nanofiber Network Membranes for PEM Fuel Cells" *ECS Transactions*, vol. 16 (2) pp. 1433-1442 (2008).

Feng, "Recent Progress in the Preparation, Characterization, and Applications of Nanofibers and Nanofiber Membranes via Electrospinning/Interfacial Polymerization" *Journal of Applied Polymer Science*, vol. 115, 756-776 (2010).

Lee, "Nafion Nanofiber Membranes", *ECS Transactions*, vol. 25 (1 Part 2), pp. 1451-1458 (2009).

Park, "Apparatus for preparing electrospun nanofibers: designing an electrospinning process for nanofiber fabrication", *Polym. Int.*, vol. 56, pp. 1361-1366 (2007).

* cited by examiner

REINFORCED ELECTROLYTE MEMBRANE

CROSS REFERENCE TO RELATED APPLICATIONS

This application is a national stage filing under 35 U.S.C. 371 of PCT/US2011/036935, filed May 18, 2011, which claims priority to Provisional Patent Application No. 61/348,086, filed May 25, 2010, the disclosures of which are incorporated by reference in their entirety herein.

This invention was made with U.S. Government support under Cooperative Agreement DE-FG36-07GO17006 awarded by DOE. The U.S. Government has certain rights in this invention.

FIELD OF THE INVENTION

The present invention relates to electrolyte membranes such as may be used in electrochemical devices, such as fuel cells. The present invention relates to electrolyte membranes that may demonstrate improved ability to preserve proton conductivity and remain stable when operated at high temperatures.

BACKGROUND

Fuel cells are electrochemical devices that produce usable electricity by the catalyzed combination of a fuel such as hydrogen and an oxidant such as oxygen. In contrast to conventional power plants, such as internal combustion generators, fuel cells do not utilize combustion. As such, fuel cells produce little hazardous effluent. Fuel cells convert hydrogen fuel and oxygen into water with the generation of usable electricity, and can be operated at higher efficiencies compared to internal combustion generators.

U.S. Published Patent Application No. 2008/0113242, incorporated herein by reference, describes polyvinylidene fluoride (PVDF) microporous films for use in ion conductive membranes.

U.S. Published Patent Application No. 2002/0100725 purportedly describes a method for preparing a thin fiber-structured polymer web using electrospinning.

International (PCT) Published Patent Application No. KR 2004/003238 purportedly describes a fuel cell having a porous and continuous membrane as the electrolyte membrane, containing polymer nanofibers.

U.S. Published Patent Application No. 2009/0239123 purportedly describes an electrolyte membrane for polymer electrolyte fuel cells, reinforced with a nonwoven fabric made of a fiber of a fluororesin.

JP-A-2009-245639 purportedly describes an electrolyte membrane for a polymer electrolyte fuel cell containing an ion exchange resin reinforced with a nonwoven fabric made of fluorocarbon resin fibers.

SUMMARY

In an embodiment, the current disclosure includes an electrolyte membrane, having a first proton conducting polymer reinforced with a nanofiber mat; wherein the nanofiber mat is made from a nanofiber comprising a fiber material selected from polymers and polymer blends; wherein the fiber material has a fiber material proton conductivity; wherein the first proton conducting polymer has a first proton conducting polymer conductivity; and wherein the fiber material proton conductivity is less than the first proton conducting polymer conductivity.

In some embodiments of the current disclosure, the fiber material in the electrolyte membrane may include highly fluorinated polymer, perfluorinated polymer, hydrocarbon polymer, blends and combinations thereof. In some embodiments of the current disclosure, the fiber material in the electrolyte membrane may include a polymer suitable for electrospinning selected from the group consisting of PVDF, PES, PEI, PBI, PPO, PEEK, PPES, PEK, blends and combinations thereof. In some embodiments of the current disclosure, the fiber material in the electrolyte membrane may be an electrospun nanofiber. In some embodiments of the current disclosure, the fiber material in the electrolyte membrane may include a stabilizing additive, which may include an element selected from Mn or Ce.

In some embodiments of the current disclosure, the nanofiber mat in the electrolyte membrane is made from a nanofiber comprising a fiber material suitable for electrospinning selected from PES and PES blended with PVDF, and wherein the fiber material is substantially nonconductive. In some embodiments of the current disclosure, the nanofiber mat in the electrolyte membrane may be made from a nanofiber comprising a fiber material suitable for electrospinning selected from PES and PES blended with PVDF, and wherein the fiber material is substantially nonconductive. In some embodiments of the current disclosure, the nanofiber mat in the electrolyte membrane may be a nonwoven web of the nanofiber. In some embodiments of the current disclosure, the nanofiber mat in the electrolyte membrane has a thickness in the range of from about 5 micrometers to about 15 micrometers.

In some embodiments of the current disclosure, the nanofiber mat in the electrolyte membrane has a porosity in a range of from about 30% to about 90%. In some embodiments of the current disclosure, the nanofiber mat in the electrolyte membrane has an average thickness in a range of about 20% to 60% of an average thickness of the electrolyte membrane.

In some embodiments of the current disclosure, the nanofiber in the electrolyte membrane may have a proton conducting polymer. In some embodiments of the current disclosure, the nanofiber in the electrolyte membrane may be crosslinked. In some embodiments of the current disclosure, the nanofiber in the electrolyte membrane may have an average diameter no greater than 1000 nm. In some embodiments of the current disclosure, the nanofiber in the electrolyte membrane may have an average diameter in the range of about 80 nm to 700 nm.

In some embodiments of the current disclosure, the first proton conducting polymer in the electrolyte membrane may include highly fluorinated ionomer, perfluorinated ionomer, hydrocarbon ionomer, or blends and combinations thereof. In some embodiments of the current disclosure, the first proton conducting polymer in the electrolyte membrane may be crosslinked. In some embodiments of the current disclosure, the first proton conducting polymer in the electrolyte membrane may include a stabilizing additive, which may include an element selected from Mn or Ce.

In some embodiments of the current disclosure, the electrolyte membrane has a thickness in the range of from about 10 micrometers to about 20 micrometers.

In an embodiment, the current disclosure includes a multilayer electrolyte membrane have an electrolyte membrane of the current disclosure further having at least one layer of a second proton conducting polymer adhered to a major surface of the electrolyte membrane, where the second proton conducting polymer may include highly fluorinated ionomer, perfluorinated ionomer, hydrocarbon ionomer, or blends and combinations thereof. In some embodiments, the second proton conducting polymer may be different from the first proton conducting polymer.

In an embodiment, the current disclosure includes a membrane electrode assembly having an electrolyte membrane of the current disclosure.

In another aspect, the current disclosure includes a method of making an electrolyte membrane, including: (a) providing a nanofiber mat comprising a nanofiber, where the fiber material has a fiber material proton conductivity, and where the nanofiber includes a polymer selected from PVDF, PES, PEI, PBI, or blends and combinations thereof; and (b) at least partially filling the nanofiber mat with a first proton conducting polymer, where the first proton conducting polymer has a first proton conducting polymer conductivity, and where the fiber material proton conductivity is less than the first proton conducting polymer conductivity.

In some embodiments, the method of the current disclosure may include a step of adding a layer of a second proton conducting polymer to the nanofiber mat.

In some embodiments of the method of the current disclosure, the first proton conducting polymer is dissolved in a solvent prior to step b), and the method further includes step c) drying the solvent from the first proton conducting polymer.

In some embodiments of the method of the current disclosure, the at least partially filling in step b) includes contacting the nanofiber mat with a melt of the first proton conducting polymer. In some embodiments of the method of the current disclosure, the at least partially filling in step b) includes laminating the nanofiber mat with a layer of the proton conducting polymer.

In some embodiments, the method of the current disclosure may include a step of crosslinking the fiber material after step a). In some embodiments, the method of the current disclosure may include a step of crosslinking the first proton conducting polymer. In some embodiments, the method of the current disclosure may include a step of crosslinking the second proton conducting polymer. In some embodiments of the method of the current disclosure, crosslinking may include thermally crosslinking, photochemically crosslinking, or e-beam irradiation crosslinking.

In some embodiments, the method of the current disclosure may include a step of applying a sizing, a binder, or a polymeric treatment to the nanofiber mat prior to step b).

In some embodiments of the current disclosure, a proton conducting polymer in the electrolyte membrane, whether the first proton conducting polymer, the second proton conducting polymer, or proton conducting polymer in the nanofiber, may have a pendant group that includes the structure —$OCF_2CF_2CF_2CF_2SO_3Y$, where Y is a hydrogen ion or a cation.

These and other aspects of the invention will be apparent from the detailed description below. In no event, however, should the above summaries be construed as limitations on the claimed subject matter, which subject matter is defined solely by the attached claims, as may be amended during prosecution.

GLOSSARY

In this application:

"equivalent weight" (or "EW") of a polymer means the weight of polymer in grams which will neutralize one equivalent of base (allowing that, where sulfonyl halide substituents or other substituents that would be converted into acidic functions during use of the polymer in a fuel cell are present, "equivalent weight" refers to the equivalent weight after hydrolyzation of such groups);

"highly fluorinated" means containing fluorine in an amount of 40 wt % or more, typically 50 wt % or more and more typically 60 wt % or more;

"hydrocarbon ionomers" refer collectively to ionomers having a main chain which contains hydrogen and carbon, and which may also contain a small mole fraction of hetero atoms such as oxygen, nitrogen, sulfur, and/or phosphorus. These hydrocarbon ionomers primarily include aromatic and aliphatic ionomers.

DETAILED DESCRIPTION

Reinforced electrolyte membranes taught in this disclosure may be used for fuel cell applications such as in the manufacture of fuel cell electrodes, in proton exchange membranes (PEM's) designed to be thermally and chemically robust while operating within a fuel cell's harsh environment at higher temperatures, and to exhibit excellent dimensional stability.

Reinforcing electrolyte membranes taught in this disclosure may be used in membrane electrode assemblies (MEA's) including fuel cell MEA's. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)) which functions as a solid electrolyte. One face of the PEM is in contact with an anode electrode layer and the opposite face is in contact with a cathode electrode layer. In typical use, protons are formed at the anode via hydrogen oxidation and transported across the PEM to the cathode to react with oxygen, causing electrical current to flow in an external circuit connecting the electrodes. Each electrode layer includes electrochemical catalysts, typically including platinum metal. The PEM forms a durable, non-porous, electrically non-conductive mechanical barrier between the reactant gases, yet it also passes $H^+$ ions readily. Gas diffusion layers (GDL's) facilitate gas transport to and from the anode and cathode electrode materials and conduct electrical current. The GDL is both porous and electrically conductive, and is typically composed of carbon fibers. The GDL may also be called a fluid transport layer (FTL) or a diffuser/current collector (DCC). In some embodiments, the anode and cathode electrode layers are applied to GDL's and the resulting catalyst-coated GDL's sandwiched with a PEM to form a five-layer MEA. The five layers of a five-layer MEA are, in order: anode GDL, anode electrode layer, PEM, cathode electrode layer, and cathode GDL. In other embodiments, the anode and cathode electrode layers are applied to either side of the PEM, and the resulting catalyst-coated membrane (CCM) is sandwiched between two GDL's to form a five-layer MEA.

In some embodiments, an MEA comprises one or more of the reinforced electrolyte membranes taught in this disclosure. In some embodiments, a PEM comprises one or more of the reinforced electrolyte membranes taught in this disclosure. In some embodiments, an MEA comprises a PEM comprising one or more of the reinforced electrolyte membranes taught in this disclosure.

Figure 1:
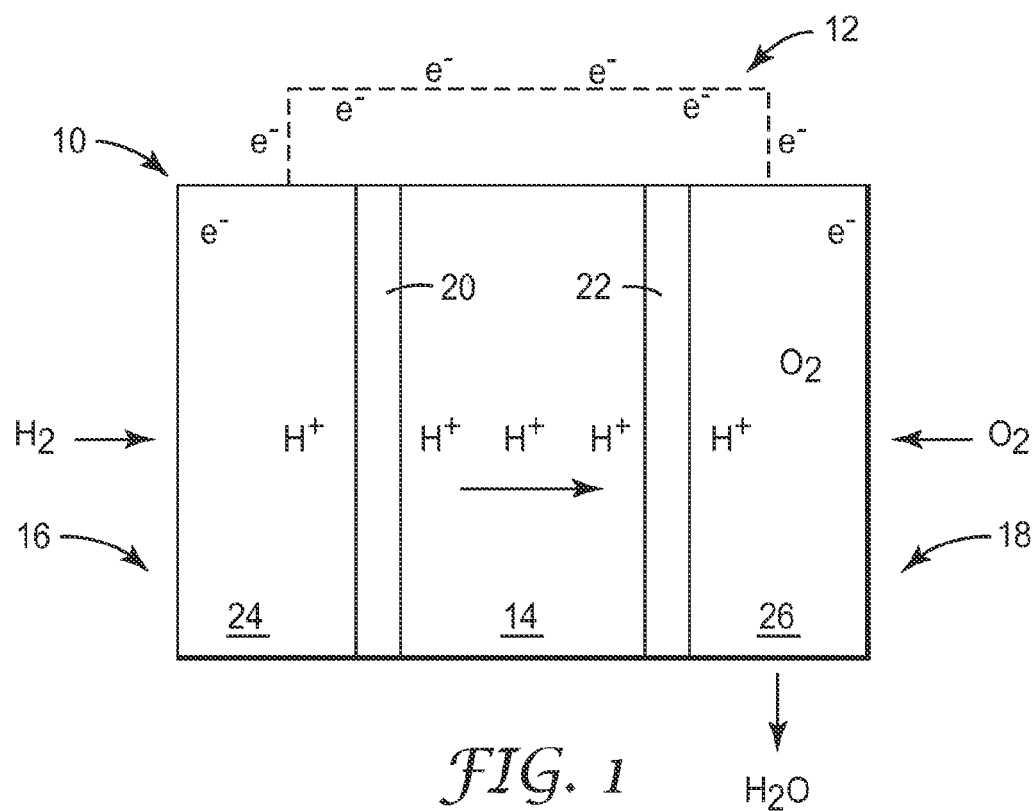
FIG. 1 is a schematic illustration of a membrane electrode assembly of the present disclosure in use with an external electrical circuit.

FIG. 1 is an illustration of MEA 10 in use with external electrical circuit 12, where MEA 10 includes electrolyte membrane 14 of the present description. MEA 10 is suitable for use in electrochemical cells, such as PEM fuel cells, and further includes anode portion 16, cathode portion 18, catalyst layers 20 and 22, and gas diffusion layers 24 and 26. Anode portion 16 and cathode portion 18 generally refer to the anode and cathode sides of MEA 10.

Electrolyte membrane 14 is disposed between catalyst layers 20 and 22, where electrolyte membrane 14 and catalyst layers 20 and 22 may be a catalyst coated membrane. Electrolyte membrane 14 is thermally stable, and may be operated at high temperatures (e.g., up to 150° C.) and low relative humidity for automotive applications or reformate systems, while exhibiting good proton conductivity. In the current disclosure, electrolyte membrane 14 has a reinforcing nanofiber mat (discussed below).

Catalyst layer 20 is disposed between electrolyte membrane 14 and gas diffusion layer 24, where gas diffusion layer 24 is located at anode portion 16 of MEA 10. Similarly, catalyst layer 22 is disposed between electrolyte membrane 14 and gas diffusion layer 26, where gas diffusion layer 26 is located at cathode portion 18 of MEA 10. Gas diffusion layers 24 and 26 may each be any suitable electrically conductive porous substrate, such as carbon fiber constructions (e.g., woven and non-woven carbon fiber constructions). Gas diffusion layers 24 and 26 may also be treated to increase or impart hydrophobic properties.

During operation of MEA 10, hydrogen fuel ($H_2$) is introduced into gas diffusion layer 24 at anode portion 16. MEA 10 may alternatively use other fuel sources, such as methanol, ethanol, formic acid, and reformed gases. The fuel passes through gas diffusion layer 24 and over catalyst layer 20. At catalyst layer 20, the fuel is separated into hydrogen ions ($H^+$) and electrons ($e^-$). Electrolyte membrane 14 only permits the hydrogen ions to pass through to reach catalyst layer 22 and gas diffusion layer 26. The electrons cannot pass through electrolyte membrane 14. As such, the electrons flow through external electrical circuit 12 in the form of electric current. This current can power an electric load, such as an electric motor, or be directed to an energy storage device, such as a rechargeable battery. Oxygen ($O_2$) is introduced into gas diffusion layer 26 at cathode portion 18. The oxygen passes through gas diffusion layer 26 and over catalyst layer 22. At catalyst layer 22, oxygen, hydrogen ions, and electrons combine to produce water and heat.

Figures 2A, 2B:
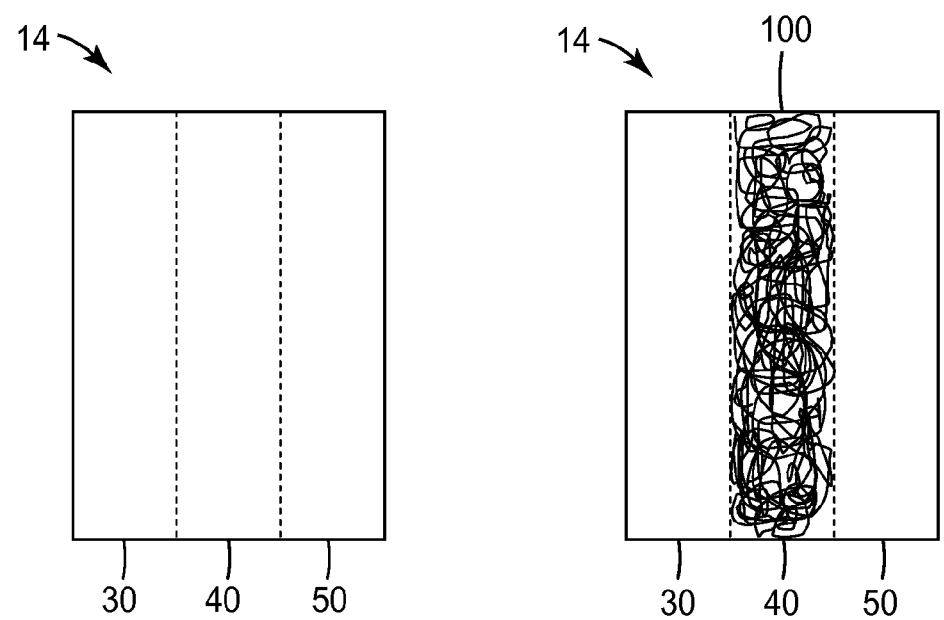
FIG. 2A is a schematic illustration of an electrolyte membrane showing a central layer region and two outer layer regions.
FIG. 2B is a schematic illustration of an electrolyte membrane similar to that shown in FIG. 2A, but having a nanofiber mat in the central layer region.

FIG. 2A is an illustration of an electrolyte membrane 14, shown here as a contiguous electrolyte membrane having a central layer region 40 and outer layer regions 30 and 50 on either side of central layer region 40. While 30, 40 and 50 are shown in FIG. 2A as separate layer regions, the material in these regions may typically be all of the same type and continuous across all three regions, providing a non-reinforced comparative example.

Figure 3:
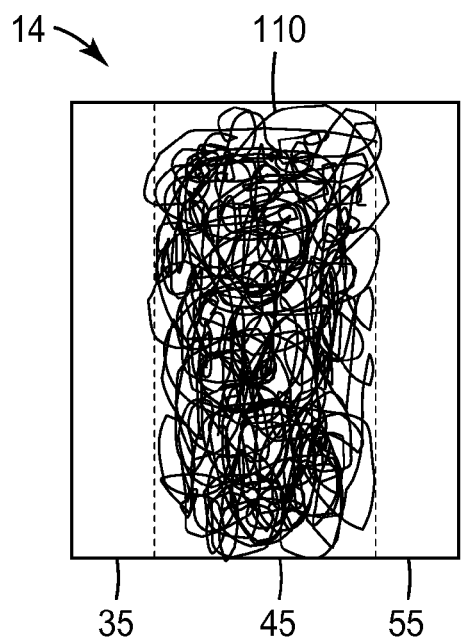
FIG. 3 is a schematic illustration of an electrolyte membrane having a nanofiber mat in a central layer region that is proportionally larger than outer layer regions.

FIG. 2B is an illustration of an electrolyte membrane 14 of the current disclosure, reinforced with a nanofiber mat 100. In FIG. 3, central layer region 40 is now shown as largely occupied by nanofiber mat 100, and central layer region 40 is also shown to have a thickness similar to that of outer layer regions 30 and 50. In other embodiments of the current description, the various layer regions 30, 40, and 50 may have different thicknesses. For example, FIG. 3 schematically illustrates another embodiment of an electrolyte membrane 14, shown as a contiguous electrolyte membrane reinforced with a nanofiber mat 110 that largely occupies a central layer region 45, central layer region 45 is between outer layer regions 35 and 55, and central layer region 45 may have a thickness that is proportionally larger than either of the outer layer regions 35 and 55, in contrast to the relative proportions of 30, 40, and 50 in FIG. 2B. For example, in some embodiments of the current disclosure, an average thickness of nanofiber mat 100 may be in a range of about 20% to 60% of an average thickness of electrolyte membrane 14. It may be desirable for the thickness each of the outer layer regions to be at least 10% of an average thickness of electrolyte membrane 14 in order to avoid problems related to separation of proton conducting material from the nanofiber mat. However, the illustrated embodiments are not intended to limit the selection of individual layer region thicknesses or proportions thereof, the selection of which may depend on a combination of factors including desired overall electrolyte membrane thickness, material properties, and ease of manufacture.

In some embodiments of the current disclosure, layer regions 30, 40, and 50 of electrolyte membrane 14 contain a proton conducting polymer, and are substantially filled with the proton conducting polymer, in addition to having nanofiber mat 100 located in layer region 40. The proton conducting material may be the same for each layer region, or may be the same in any two of the layer regions and different in the third layer region, or may be different in each of the layer regions.

Figure 2C:
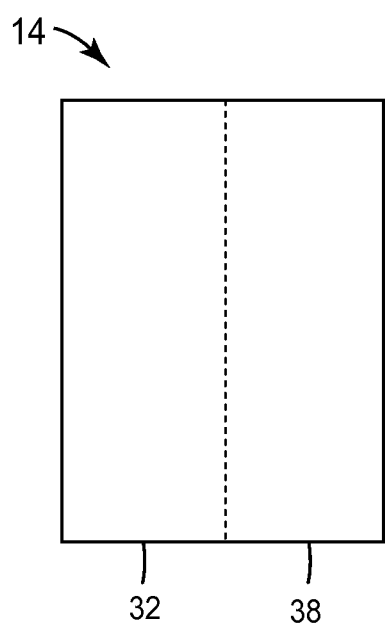
FIG. 2C is a schematic illustration of an electrolyte membrane showing two layer regions.
Figure 2D:
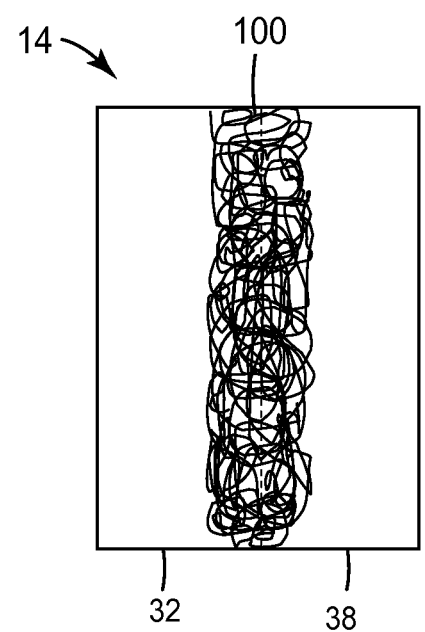
FIG. 2D is a schematic illustration of an electrolyte membrane similar to that shown in FIG. 2C, but having a nanofiber mat embedded across the interface of the two layer regions.

In another embodiment of the current disclosure, FIG. 2D schematically illustrates an electrolyte membrane 14 having layer regions 32 and 38 in contact with each other at an interface and nanofiber mat 100 embedded in both layer regions and extending across the interface of layer regions 32 and 38. FIG. 2C illustrates the two layer regions of FIG. 2D without nanofiber mat, in order to show the two layer regions more clearly. Layer regions 32 and 38 contain a proton conducting polymer, and are substantially filled with the proton conducting polymer, in addition to having nanofiber mat 100 located in layer region 40. The proton conducting material may be the same for each layer region, or may be the same in any two of the layer regions and different in the third layer region, or may be different in each of the layer regions.

Proton conducting polymers of the present description may include an acidic polymeric material that is thermally stable and includes bound-anionic functional groups such that, when the counter-ions to the bound-anionic functional groups are protons, the resulting acidic polymer has a pKa of less than about 5. Examples of suitable acidic polymers for use in electrolyte membrane 14 include fluoropolymers having pendant groups terminating in acidic groups. Suitable pendent groups for the fluoropolymer include sulfonic acid groups having the formula —$R^1$—$SO_3Y$, where $R^1$ may be a branched or unbranched perfluoroalkyl, perfluoroalkoxy, or perfluoroether group, which contains 1-15 carbon atoms and 0-4 oxygen atoms, and where Y is a hydrogen ion, a cation, or combinations thereof. In some embodiments, examples of suitable pendant groups include —$OCF_2CF(CF_3)OCF_2CF_2SO_3Y$, —$O(CF_2)_4SO_3Y$, and combinations thereof. In some embodiments, examples of suitable pendant groups include —$CF_2SO_2N(Z)SO_2(CF_2)_3SO_3Y$, where Z is a suitable counterction, as described in U.S. Provisional Patent Application Ser. No. 61/325,062, incorporated herein by reference.

The fluoropolymer may also include one or more acidic endgroups, such as sulfonyl endgroups having the formula —$SO_3Y$. The backbone chain of the acidic polymer may be partially or fully fluorinated. Suitable fluorine concentrations in the backbone chain include about 40% or more by weight, based on the entire weight of the backbone chain. In one embodiment of the present description, the backbone chain of the fluoropolymer is perfluorinated.

It will be understood that in some embodiments the PEM fuel cells could be prepared using fully fluorinated ionomers wherein the ionomer constitutes a substantial portion of the membrane, preferably at least 50% by volume (in some embodiments, in a range from 50% by volume to 95% by volume; in some embodiments, in a range of from 70% by volume to 90% by volume) of the membrane, the remaining volume being taken up by the nanofiber mat.

In an embodiment, the proton conducting material of the present description may include a hydrocarbon ionomer. As used herein, "hydrocarbon ionomers" refer collectively to ionomers having a main chain which contains hydrogen and carbon, and which may also contain a small mole fraction of hetero atoms such as oxygen, nitrogen, sulfur, and/or phosphorus. These hydrocarbon ionomers primarily include aromatic and aliphatic ionomers. Examples of suitable aromatic ionomers include but are not limited to sulfonated polyimides, sulfoalkylated polysulfones, poly(beta-phenylene) substituted with sulfophenoxy benzyl groups, and polybenzimidazole ionomers. Non-limiting examples of suitable aliphatic ionomers are those based upon vinyl polymers, such as cross-linked poly(styrene sulfonic acid), poly(acrylic acid), poly(vinylsulfonic acid), poly(2-acrylamide-2-methylpropanesulfonic acid) and their copolymers. It is understood that membranes for PEM fuel cells could be prepared using a blend of different ionomer materials, and a hydrocarbon membrane is considered to be a membrane comprising a hydrocarbon ionomer as defined above when the membrane contains different ionomers and the hydrocarbon ionomer constitutes at least a substantial portion, preferably at least about 50% by volume, of the membrane.

Proton conducting materials useful in making reinforced electrolyte membranes or MEA's according to the present disclosure typically have an equivalent weight (EW) of 1200 or less, more typically 1100 or less, more typically 1050 or less, more typically 1000 or less, and in some embodiments 950 or less, 900 or less, 850 or less, or 800 or less, or even 700 or less.

In the formation of a reinforced electrolyte membrane, the proton conducting material can be coated onto a nanofiber mat by any suitable method. The polymer may cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher. The reinforced electrolyte membrane typically has a thickness of less than 50 micrometers, more typically less than 40 micrometers, more typically less than 30 micrometers, more typically less than 25 micrometers, and most typically about 20 micrometers.

In one embodiment of the present disclosure, the polymer electrolyte may contain or comprise one or more of the polyoxometalate or heteropolyacid additives described in U.S. Published Patent Application No. 2009/0208809, the description of which is incorporated herein by reference.

In one embodiment of the present disclosure, a stabilizing additive may be added to the proton conducting polymer. In one embodiment of the present disclosure, a salt or oxide of manganese or cerium, more typically a salt, more typically manganese, is added to the acid form polymer electrolyte prior to membrane formation. Typically the salt is mixed well with or dissolved within the polymer electrolyte to achieve substantially uniform distribution. The salt may comprise any suitable anion, including chloride, bromide, nitrate, carbonate and the like. Once cation exchange occurs between the transition metal salt and the acid form polymer, it may be desirable for the acid formed by combination of the liberated proton and the original salt anion to be removed. Thus, it may be preferred to use anions that generate volatile or soluble acids, for example chloride or nitrate. Manganese cations may be in any suitable oxidation state, including $Mn^{2+}$, $Mn^{3+}$ and $Mn^{4+}$, but are most typically $Mn^{2+}$. The amount of salt added is typically between 0.001 and 0.5 charge equivalents based on the molar amount of acid functional groups present in the polymer electrolyte, more typically between 0.005 and 0.2, more typically between 0.01 and 0.15, and more typically between 0.02 and 0.1. Additional examples of suitable additives are described in U.S. Pat. No. 7,572,534 (includes Mn salts), U.S. Published Patent Application No. 2010/0062314 (includes Mn oxides), U.S. Published Patent Application No. 2007/0099053 (includes Ce salts), U.S. Published Patent Application No. 2007/0099052 (includes Ce oxides), U.S. Published Patent Application No. 2009/0208809 (includes heteropolyacids), and U.S. Published Patent Application No. 2009/0169959 (includes combination of Mn salts and Ce oxides), the description of which are each included herein by reference.

In an embodiment of the disclosure, nanofiber mat 100 may be a nonwoven web of nanofibers. The nanofibers may have an average diameter in the range of 80-1000 nanometers, or more typically about 80-700 nanometers. A useful thickness for the nanofiber mat is 5-25 micrometers, or more typically about 5-15 micrometers. It is useful for the nanofiber mat to have a porosity value in the range of about 30% to 90%, or typically in the range of about 50% to 80%, or more typically in the range of about 60% to 70% ("porosity" is determined semi-empirically, as described in the Examples section).

In some embodiments, the nanofiber mat may have an average basis weight (see Examples section) in a range from 4.5 g/m² to 6.5 g/m², or even from 3.2 g/m² to 6.5 g/m². An average basis weight in a range from 2 g/m² to 10 g/m² is also considered to be useful.

Nanofibers of the current disclosure may be made from a fiber material that includes polymers or polymer blends, including polymers suitable for electrospinning. Examples of polymers suitable for electrospinning may include fluorinated polymers, including the polyvinylidene difluoride (PVDF) materials KYNAR 761 and KYNAR 2801 (a PVDF copolymer) available from Arkema Inc. (Philadelphia, Pa.). Non-fluorinated polymers suitable for electrospinning to produce nanofibers may include polyether sulfone (PES) materials, commercially available examples of which may include ULTRASON E6020P, available from BASF (Florham Park, N.J.), and VERADEL PES material available from Solvay (Houston, Tex.). Other non-fluorinated materials suitable for electrospinning to produce mats of the current disclosure may include hydrocarbon aromatic polymers, including polyphenylene oxide (PPO), polyphenylene ether sulfone (PPES), polyether ketone (PEK), polyether ether ketone (PEEK), polyetherimide (PEI), polybenzimidazole (PBI), polybenzimidazole oxide (PBIO), as well as blends and combinations of these.

In some embodiments of the nanofibers of the current disclosure the fiber material has a bulk property selected from the group consisting of a glass transition temperature ("$T_g$") greater than 180° C. and a melting point ("$T_m$") greater than 180° C.

In some embodiments of nanofibers of the current disclosure, a proton conducting material may be added to the fiber material prior to electrospinning, resulting in fibers that may have some level of proton conductivity, whereas without the added proton conducting material, the fibers may be substantially nonconductive. Typically, the level of conductivity of the fibers having a proton conducting polymer additive would be less than the proton conductivity of the proton conducting material alone. Another reason that it may be desirable to include proton conducting material to the fiber material is to produce fibers that have enhanced adhesion to a proton conducting polymer coating applied to the nanofiber mat. The types of proton conducting materials that may be added to the fiber material prior to electrospinning may include the highly fluorinated proton conducting polymers, perfluorinated proton conducting polymers, and hydrocarbon proton conducting polymers described in the current disclosure. The amount of proton conducting material that may be added to the fiber material prior to electrospinning may be in the range of from about 1 wt % to about 50 wt %, in the range of from about 1 wt % to about 15 wt %, or more typically in the range of from about 1 wt % to about 5 wt %.

Figure 5:
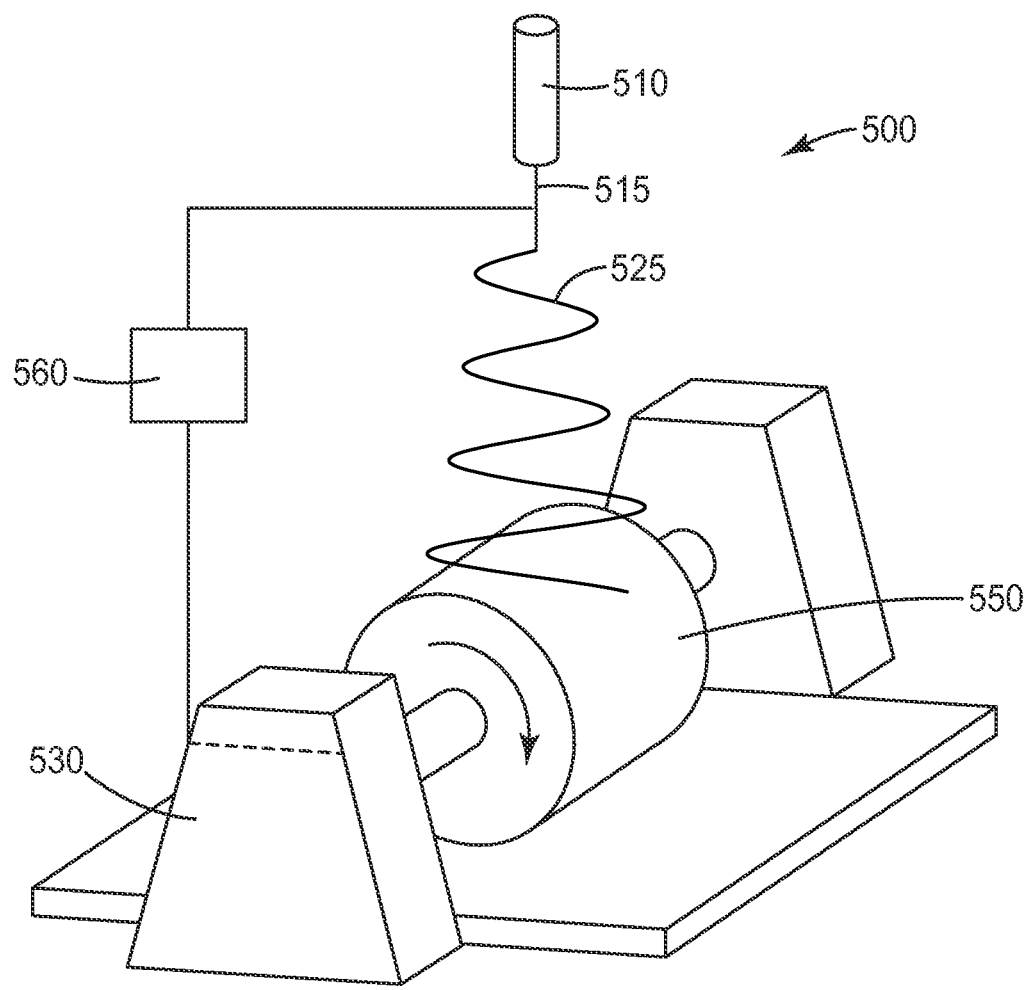
FIG. 5 is a schematic representation of an electrospinning apparatus of the current disclosure.

Methods for electrospinning polymers and polymer blends to make nanofibers and nanofiber mats are known in the art, using, for example, the methods and types of apparatus described in Polym. Int., Vol. 56, pp. 1361-1366 (2007), or Journal of Applied Polymer Science, Vol. 115, 756-776 (2010). FIG. 5 schematically illustrates an electrospinning apparatus 500, having syringe 510 filled with a polymer or polymer blend suitable for electrospinning, target 550 aligned with needle 515 of syringe 510, and a voltage supply 560 to maintain a voltage in the range of about 1 to 20 kV, or more typically about 8.5 kV between syringe needle 515 and target 550. It will be understood that while target 550 is shown in FIG. 5 as a rotating cylinder, the target may alternatively be a substantially flat surface, and either stationary or moving.

The thickness of the nanofiber mat as produced from an electrospinning process may need to be adjusted by pressing the mat in a calendaring roller or other pressing apparatus, and this pressing operation may be carried out at a temperature that may result in some fusion of fibers at contact points, depending on the material used. For example, when the nanofiber material is PVDF, PES, or blends thereof, a calendaring temperature of 140° C. may be used, which may result in some fusion of fibers at contact points. Typically, the temperature is kept below the melting point of the fiber material.

Nanofibers of the current disclosure may be long relative to their diameters, having aspect ratios>6,000. Contact points may therefore be either intrafiber or interfiber, and if fused together may provide some amount of reinforcement to the electrolyte membrane.

Reinforced electrolyte membrane 14 may be prepared by coating nanofiber mat 100 with a proton conducting polymer of the current description. Coating may be done by standard techniques known in the art, including casting, notch bar coating, or lamination.

For high production of electrolyte membrane 14, coating may be carried out in a roll to roll fashion where the nanofiber mat is unrolled, coated with proton conducting polymer, dried, and wound onto a takeoff roll.

In some embodiments it may be desirable to activate the surface of nanofiber mat 100 prior to coating, using well known techniques that may include plasma treatment or corona treatment.

The surface of nanofiber mat 100 may also be activated with a chemical treatment, e.g., sulfonation, in order to provide additional surface charge on the fibers which may be beneficial for adhering proton conducting polymers to the nanofibers.

In some embodiments, a sizing, a binder, or a polymeric treatment may be applied to nanofiber mat 100 prior to coating with proton conducting polymer, in order to enhance durability of the electrolyte membrane.

In some embodiments, nanofiber mat 100 has two major surfaces, and each major surface may be coated with a proton conducting polymer, using the same proton conducting polymer for coating each major surface. In some embodiments, a different proton conducting polymer may be coated onto each of the major surfaces of nanofiber mat 100, as may be represented by referring to FIG. 2D where in some embodiments layer region 32 may have a first proton conducting polymer and layer region 38 may have a second proton conducting polymer different from the first proton conducting polymer.

In some embodiments, the electrolyte membrane has an overall thickness after drying in the range of about 10 micrometers to 20 micrometers.

This disclosure incorporates by reference the disclosures of U.S. patent application Ser. No. 12/342,370, filed Dec. 23, 2008, U.S. Pat. No. 7,285,349, issued Oct. 23, 2007, U.S. Pat. No. 7,348,088, issued Mar. 25, 2008, U.S. Pat. No. 6,727,386, issued Apr. 27, 2004, U.S. Pat. No. 6,863,838, issued Mar. 8, 2005, and U.S. Pat. No. 6,090,895, issued Jul. 18, 2000.

Polymers according to the present disclosure may be crosslinked by any suitable method, which may include methods disclosed in U.S. Pat. No. 7,179,847, issued Feb. 20, 2007; U.S. Pat. No. 7,514,481, issued Apr. 7, 2009; U.S. Pat. No. 7,265,162, issued Sep. 4, 2007; U.S. Pat. No. 7,074,841, issued Jul. 11, 2006; U.S. Pat. No. 7,435,498, issued Oct. 14, 2008; U.S. Pat. No. 7,259,208, issued Aug. 21, 2007; U.S. Pat. No. 7,411,022, issued Aug. 12, 2008; U.S. Pat. No. 7,060,756, issued Jun. 13, 2006; U.S. Pat. No. 7,112,614, issued Sep. 26, 2006; U.S. Pat. No. 7,060,738, issued Jun. 13, 2006; U.S. Pat. No. 7,173,067, issued Feb. 6, 2007; and U.S. Pat. No. 7,326,737, issued Feb. 5, 2008; the disclosures of which are incorporated herein by reference.

Any suitable catalyst may be used to make electrode layers and MEA's in the practice of the present disclosure. Typically, carbon-supported catalyst particles are used.

Typical carbon-supported catalyst particles are 50-90% carbon and 10-50% catalyst metal by weight, the catalyst metal typically comprising Pt for the cathode and Pt and Ru in a weight ratio of 2:1 for the anode. Typically, the catalyst is applied to the PEM or to the GDL in the form of a catalyst ink. Alternately, the catalyst ink may be applied to a transfer substrate, dried, and thereafter applied to the PEM or to the GDL as a decal. The catalyst ink typically comprises polymer electrolyte material, which may or may not be the same polymer electrolyte material which comprises the PEM. The catalyst ink typically comprises a dispersion of catalyst particles in a dispersion of the polymer electrolyte. In some embodiments of the present disclosure, a stabilizing additive could be added, typically a salt or oxide of manganese or cerium, more typically an oxide, more typically of cerium, is added to the polymer electrolyte prior to membrane formation. The ink typically contains 5-30% solids (i.e. polymer and catalyst) and more typically 10-20% solids. The electrolyte dispersion is typically an aqueous dispersion, which may additionally contain alcohols and polyalcohols such a glycerin and ethylene glycol. The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

In other embodiments, the catalyst may be a nanostructured thin film (NSTF) catalyst of the type described in U.S. Published Patent Application No. 2007/082814, U.S. Pat. No. 7,622,217, and U.S. Published Patent Application No. 2010/047668, all of which are incorporated herein by reference. These NSTF catalysts provide an alternative to the carbon-supported catalysts described above.

To make an MEA or CCM, catalyst may be applied to the PEM by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

To make an MEA, GDL's may be applied to either side of a CCM by any suitable means. Any suitable GDL may be used in the practice of the present disclosure. Typically the GDL is comprised of sheet material comprising carbon fibers. Typically the GDL is a carbon fiber construction selected from woven and non-woven carbon fiber constructions. Carbon fiber constructions which may be useful in the practice of the present disclosure may include: Toray™ Carbon Paper, SpectraCarb™ Carbon Paper, AFN™ nonwoven carbon cloth, Zoltek™ Carbon Cloth, and the like. The GDL may be coated or impregnated with various materials, including carbon particle coatings, hydrophilizing treatments, and hydrophobizing treatments such as coating with polytetrafluoroethylene (PTFE).

In some embodiments, catalyst may be applied to a GDL to make a catalyst-coated backing (CCB) and CCB's may then be combined with a PEM to make an MEA. In such embodiments, catalyst may be applied to the GDL by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

In use, the MEA according to the present typically sandwiched between two rigid plates, known as distribution plates, also known as bipolar plates (BPP's) or monopolar plates. Like the GDL, the distribution plate must be electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the bipolar plate may have one face directing fuel or oxidant to an MEA while the other face includes channels which conduct coolant. Alternately, the distribution plate may have channels on one side only, to distribute fluids to or from an MEA on only that side, which may be termed a "monopolar plate." The term bipolar plate, as used in the art, typically encompasses monopolar plates as well. A typical fuel cell stack comprises a number of MEA's stacked alternately with distribution plates.

EMBODIMENTS

Item 1. An electrolyte membrane, comprising:
a first proton conducting polymer reinforced with a nanofiber mat;
wherein the nanofiber mat is made from a nanofiber comprising a fiber material selected from polymers and polymer blends;
wherein the fiber material has a fiber material proton conductivity;
wherein the first proton conducting polymer has a first proton conducting polymer conductivity; and
wherein the fiber material proton conductivity is less than the first proton conducting polymer conductivity.

Item 2. The electrolyte membrane of item 1, wherein the fiber material is selected from the group consisting of highly fluorinated polymer, perfluorinated polymer, hydrocarbon polymer, blends and combinations thereof.

Item 3. The electrolyte membrane of item 1, wherein the fiber material comprises a polymer suitable for electrospinning selected from the group consisting of PVDF, PES, PEI, PBI, PPO, PEEK, PPES, PEK, blends and combinations thereof.

Item 4. The electrolyte membrane of item 1, wherein the nanofiber mat is made from a nanofiber comprising a fiber material suitable for electrospinning selected from PES and PES blended with PVDF, and wherein the fiber material is substantially nonconductive.

Item 5. The electrolyte membrane of any one of the preceding items, wherein the nanofiber is an electrospun nanofiber.

Item 6. The electrolyte membrane of any one of the preceding items, wherein the nanofiber mat comprises a nonwoven web of the nanofiber.

Item 7. The electrolyte membrane of item 1, wherein the nanofiber further comprises a proton conducting polymer.

Item 8. The electrolyte membrane of any one of the preceding items, wherein the first proton conducting polymer is selected from the group consisting of highly fluorinated ionomer, perfluorinated ionomer, hydrocarbon ionomer, blends and combinations thereof.

Item 9. The electrolyte membrane of any one of the preceding items, wherein the fiber material is crosslinked.

Item 10. The electrolyte membrane of any one of the preceding items, wherein the first proton conducting polymer is crosslinked.

Item 11. The electrolyte membrane of any one of the preceding items, wherein the nanofiber mat has a thickness in the range of from about 5 micrometers to about 15 micrometers.

Item 12. The electrolyte membrane of any one of the preceding items, wherein the electrolyte membrane has a thickness in the range of from about 10 micrometers to about 20 micrometers.

Item 13. The electrolyte membrane of any one of the preceding items, wherein the nanofiber has an average diameter no greater than 1000 nm.

Item 14. The electrolyte membrane of any one of the preceding items, wherein the nanofiber has an average fiber diameter in the range of about 80 nm to 700 nm.

Item 15. The electrolyte membrane of any one of the preceding items wherein the nanofiber mat has a porosity in a range of from about 30% to about 90%.

Item 16. The electrolyte membrane of any one of the preceding items wherein the first proton conducting polymer further comprises a stabilizing additive.

Item 17. The electrolyte membrane of any one of the preceding items wherein the fiber material further comprises a stabilizing additive.

Item 18. The electrolyte membrane of any one of item 16 or item 17 wherein the stabilizing additive comprises an element selected from the group consisting of Mn and Ce.

Item 19. A membrane electrode assembly comprising the electrolyte membrane of any one of the preceding items.

Item 20. A multilayer electrolyte membrane comprising: the electrolyte membrane of any one of items 1 to 19, further comprising at least one layer of a second proton conducting polymer adhered to a major surface of the electrolyte membrane, wherein the second proton conducting polymer is selected from the group consisting of highly fluorinated ionomer, perfluorinated ionomer, hydrocarbon ionomer, blends and combinations thereof, and wherein the second proton conducting polymer is different from the first proton conducting polymer.

Item 21. The multilayer electrolyte membrane of item 20, wherein an average thickness of the nanofiber mat is in a range of about 20% to 60% of an average thickness of the electrolyte membrane.

Item 22. A membrane electrode assembly comprising the multilayer electrolyte membrane of any one of item 20 or item 21.

Item 23. A method of making an electrolyte membrane, comprising:
(a) providing a nanofiber mat comprising a nanofiber, wherein the fiber material has a fiber material proton conductivity, and wherein the nanofiber comprises a polymer selected from the group consisting of PVDF, PES, PEI, PBI, blends and combinations thereof; and
(b) at least partially filling the nanofiber mat with a first proton conducting polymer, wherein the first proton conducting polymer has a first proton conducting polymer conductivity, and wherein the fiber material proton conductivity is less than the first proton conducting polymer conductivity.

Item 24. The method of item 23 further comprising a step of adding a layer of a second proton conducting polymer to the nanofiber mat.

Item 25. The method of item 23 wherein the first proton conducting polymer is dissolved in a solvent prior to step b), and the method further comprises step c) drying the solvent from the first proton conducting polymer.

Item 26. The method of item 23 wherein the at least partially filling in step b) comprises contacting the nanofiber mat with a melt of the first proton conducting polymer.

Item 27. The method of item 23 wherein the at least partially filling in step b) comprises laminating the nanofiber mat with a layer of the proton conducting polymer.

Item 28. The method of item 23 further comprising the step of crosslinking the fiber material after step a).

Item 29. The method of item 23 further comprising the step of crosslinking the first proton conducting polymer.

Item 30. The method of item 24 further comprising crosslinking the second proton conducting polymer.

Item 31. The method of any one of items 28 to 30 wherein the step of crosslinking is selected from the group consisting of thermally crosslinking, photochemically crosslinking, and e-beam irradiation crosslinking.

Item 32. The method of item 23 further comprising applying any one of a sizing, a binder, or a polymeric treatment to the nanofiber mat prior to step b).

Item 33. The electrolyte membrane of item 1, wherein the first proton conducting polymer comprises a pendant group having the structure —$OCF_2CF_2CF_2CF_2SO_3Y$, wherein Y is a hydrogen ion or a cation.

Item 34. The multilayer electrolyte membrane of item 20, wherein the second proton conducting polymer comprises a pendant group having the structure —$OCF_2CF_2CF_2CF_2SO_3Y$, wherein Y is a hydrogen ion or a cation.

EXAMPLES

Test Methods

Diameter of nanofibers was determined by field emission scanning electron microscopy (FE-SEM), using a Jeol JSM-6701F scanning electron microscope (3-5 kV, 5,000×-10,000× magnification). Average fiber diameter values in Table 1 were calculated based on samples of 100 fibers.

Basis weight of nanofiber mats was measured by cutting a 10 cm×10 cm sheet of the nanofiber mat and weighing on a balance. Average basis weight values in Table 1 were calculated based on samples of 5-6 sheets.

Porosity of nanofiber mats was estimated semi-empirically according to the equation below, using a sample that had been folded onto itself with minimal pressing, to reduce measuring error, cutting out a section of known area, and measuring the thickness and weight of the section, and using the intrinsic density of the material.

Porosity (%)=(1−(weight/(intrinsic density×area×thickness)))×100

Thickness of the nanofiber mats and reinforced electrolyte membranes was measured using a TMI 49-16-01 Precision Micrometer from Testing Machines Inc. (Ronkonkoma, N.Y.), with a dead weight pressure of 50 kPa (7.3 psi) and a diameter of standard anvil of 0.63 inch (1.6 cm). Typically, an average value of 5-10 sheets was calculated.

Linear Swell in hot water was determined by cutting three 1 cm×7 cm strips from a sample of membrane, boiling the strips in deionized water for 30 minutes and then cooling the strips and water to room temperature, keeping the strips in the water during the cooling. The "swollen length", i.e., the length of each swollen strip of membrane, was then measured with a ruler or other measuring device while the strip was still under water. The percent swell was calculated as follows:

% Swell=100×(swollen length−dry length)/(dry length)

Materials

KYNAR 761—a polyvinylidene difluoride (PVDF), available from Arkema Inc. (Philadelphia, Pa.).

KYNAR 2801—a polyvinylidene difluoride (PVDF) copolymer, available from Arkema Inc. (Philadelphia, Pa.).

PES—Polyethersulfone, ULTRASON E6020P available from BASF (Florham Park, N.J.)

Preparative Example 1: PVDF Nanofiber Mat

PVDF nanofibers were prepared by an electrospinning technique. A solution of a PVDF copolymer (KYNAR 2801) in N,N-dimethylacetamide at about 20 wt % solids was delivered via syringe onto a collector roll at 25° C., keeping a potential difference of 8.5 kV between the nozzle of the syringe and the collector. Dry nanofiber accumulated on the collector as a nanofiber web. The nanofiber web was calendared at 140° C. to flatten the web. Several properties of the nanofibers and the nanofiber mat are shown in Table 1 (PE-1).

Preparative Example 2: PVDF Nanofiber Mat

Figure 4A:
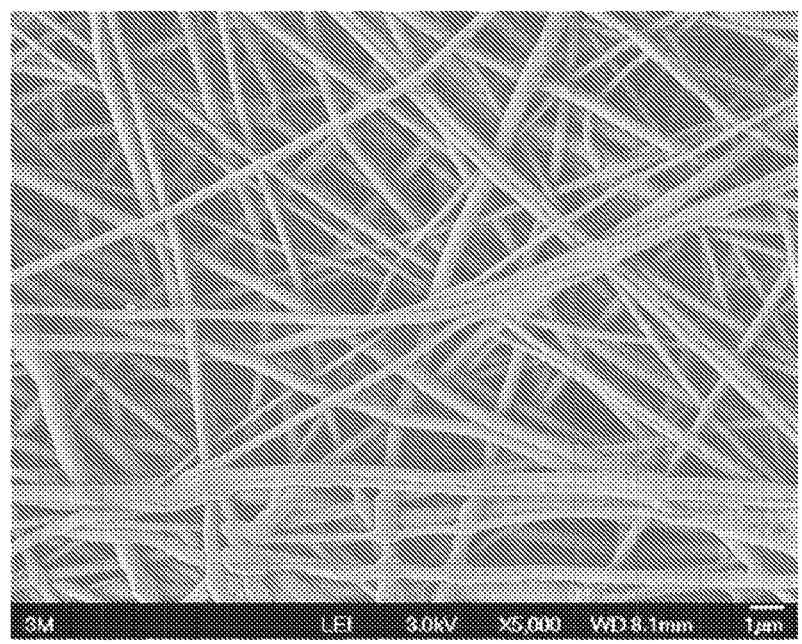
FIGS. 4A, 4B, and 4C are scanning electron micrographs of nanofiber mats of the current description.

PVDF nanofibers were prepared by an electrospinning technique. A solution of a PVDF (KYNAR 761) in N,N-dimethylacetamide at about 20 wt % solids was delivered via syringe onto a collector roll at 25° C., keeping a potential difference of 8.5 kV between the nozzle of the syringe and the collector. Dry nanofiber accumulated on the collector as a nanofiber web. The nanofiber web was calendared at 140° C. to flatten the web. A SEM image of an electrospun PVDF nanofiber mat so produced is shown in FIG. 4A, and several properties of the nanofibers and the nanofiber mat are shown in Table 1 (PE-2).

Preparative Example 3: PES Nanofiber Mat

Figure 4B:
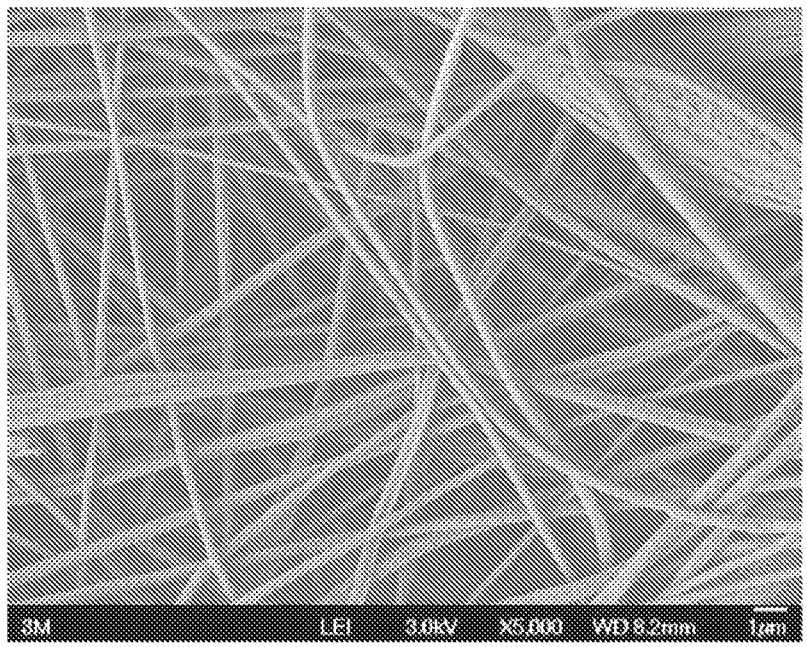
Figure 4C:
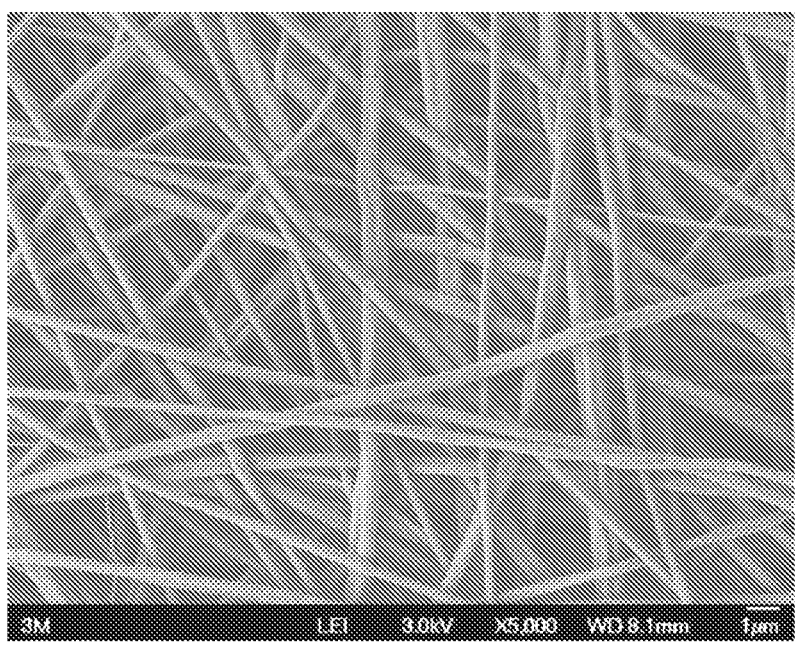

PES nanofibers were prepared by an electrospinning technique. A solution of a PES in a mixture of N,N-dimethylacetamide/acetone at about 20 wt % solids was delivered via syringe onto a collector roll at 25° C., keeping a potential difference of 8.5 kV between the nozzle of the syringe and the collector. Dry nanofiber accumulated on the collector as a nanofiber web. The nanofiber web was calendared at 140° C. to flatten the web. A SEM image of an electrospun PVDF nanofiber mat so produced is shown in FIG. 4C, and several properties of the nanofibers and the nanofiber mat are shown in Table 1 (PE-3).

Preparative Example 4: PES/PVDF Blend Nanofiber Mat

PES/PVDF (9:1) nanofibers were prepared by an electrospinning technique. A solution of a PES/PVDF (9:1) in a mixture of N,N-dimethylacetamide/acetone at about 20 wt % solids was delivered via syringe onto a collector roll at 25° C., keeping a potential difference of 8.5 kV between the nozzle of the syringe and the collector. Dry nanofiber accumulated on the collector as a nanofiber web. The nanofiber web was calendared at 140° C. to flatten the web. A SEM image of an electrospun PES/PVDF (9:1) nanofiber mat so produced is shown in FIG. 4B, and several properties of the nanofibers and the nanofiber mat are shown in Table 1 (PE-4).

TABLE 1

| Sample | Fiber Type | Diameter (micrometers) | Basis Weight (g/m$^2$) | Porosity (%) | Thickness (micrometers) |
|---|---|---|---|---|---|
| PE-1 | PVDF | 0.230 | 4.7 | 66 | 10.0 |
| PE-2 | PVDF | 0.360 | 6.5 | 61 | 8.2 |
| PE-3 | PES | 0.455 | 5.4 | 60 | 8.9 |
| PE-4 | PES/PVDF (9/1) | 0.418 | 4.5 | 70 | 10.9 |
| PE-5 | PES/PVDF (7/3) | 0.550 | 3.2 | 69 | 6.9 |
| PE-6 | PES/PVDF (7/3) | 0.443 | 4.3 | 73 | 10.5 |
| PE-7 | PES/PVDF (7/3) | 0.456 | 5.5 | 71 | 12.8 |
| PE-8 | PES/PVDF (7/3) | 0.431 | 6.1 | 70 | 13.8 |

In Table 1, the Diameter values are for nanofibers in the calendared nanofiber mat, and the Basis Weight, Porosity and Thickness values are for calendared nanofiber mat.

Working Example 1: Electrolyte Membrane Reinforced with PVDF Nanofiber Mat

A sample of an 825 EW perfluorosulfonic acid ionomer of the type described in U.S. Published Patent Application No. 2006/0014887 was dissolved at about 20% solids by weight in a mixture of n-propanol/water (50/50 by wt). The solution of ionomer was coated onto a polyester (PET) liner at a constant flow rate using a coating die and a line speed of about 2 meters per minute, with a target dry thickness of 8 micrometers, using a pilot-scale coater manufactured by Hirano Entec Ltd. (Nara, Japan) having four drying zones arranged sequentially in a down-web direction and set to 50° C., 100° C., 120° C., and 145° C., respectively. Immediately after the solution of ionomer was coated onto the polyester liner and before it entered the first drying zone, a small sheet (20 cm×20 cm) of the PVDF nanofiber mat of PE-1 was laid by hand on top of the coated solution, and the sample was then carried through the drying ovens and collected. Another layer of the 825 EW perfluorosulfonic acid ionomer solution was coated onto the PVDF nanofiber mat at the same flow rate and drying conditions. Properties of the electrolyte membrane so produced are listed in Table 2 (Ex-1).

Working Example 2: Electrolyte Membrane Reinforced with PVDF Nanofiber Mat, with Stabilizing Additive A sample of an 825 EW perfluorosulfonic acid ionomer of the type described in U.S. Published Patent Application No. 2006/0014887, having about 3.5% of the acid groups neutralized with manganese cations, was dissolved at about 15% solids by weight in a mixture of n-propanol/water (50/50 by wt). Using a pilot-scale coater having three drying zones arranged sequentially in a down-web direction and set to 50° C., 120° C., and 145° C., respectively, the solution of ionomer was coated onto a polyimide liner (KAPTON, available from DuPont (Wilmington, Del.)) using a notch bar with a gap of 0.008 inch (about 200 micrometers) and a line speed of about 6 feet (1.8 meters) per minute, with a target dry thickness of 8 micrometers. Immediately after the solution of ionomer was coated onto the polyimide liner and before it entered the first drying zone, the leading edge of a web of 25 cm wide PVDF nanofiber mat (web) of PE-2 was introduced by hand on top of the coated solution. The PVDF nanofiber web was continuously unwound at the same speed as the polyimide web and the two webs were continuously joined together as new coating solution was applied to the polyimide film. The sample was then carried through the drying ovens and collected. Another layer of the 825 EW perfluorosulfonic acid ionomer solution was coated onto the PVDF nanofiber mat using a notch bar gap of 0.006 inch (about 150 micrometers) and the same drying conditions. Properties of the electrolyte membrane so produced are listed in Table 2 (Ex-2).

Working Example 3: Electrolyte Membrane Reinforced with a PES Nanofiber Mat, with Stabilizing Additive A sample of an 825 EW perfluorosulfonic acid ionomer of the type described in U.S. Published Patent Application No. 2006/0014887, having about 3.5% of the acid groups neutralized with manganese cations, was dissolved at about 15% solids by weight in a mixture of n-propanol/water (50/50 by wt). Using a pilot-scale coater having three drying zones arranged sequentially in a down-web direction and set to 50° C., 120° C., and 145° C., respectively, the solution of ionomer was coated onto a polyester (PET) liner using a notch bar with a gap of 0.008 inch (about 200 micrometers) and a line speed of about 6 feet (1.8 meters) per minute, with a target dry thickness of 8 micrometers. Immediately after the solution of ionomer was coated onto the polyester liner and before it entered the first drying zone, the leading edge of a web of 25 cm wide PES nanofiber mat (web) of PE-3 was introduced by hand on top of the coated solution. The PES nanofiber web was continuously unwound at the same speed as the polyester web and the two webs were continuously joined together as new coating solution was applied to the polyester film. The sample was then carried through the drying ovens and collected. Another layer of the 825 EW perfluorosulfonic acid ionomer solution was coated onto the PES nanofiber mat at the same notch bar gap and drying conditions. Properties of the electrolyte membrane so produced are listed in Table 2 (Ex-3).

Working Example 4: Electrolyte Membrane Reinforced with a PES/PVDF Blend Nanofiber Mat A sample of an 825 EW perfluorosulfonic acid ionomer of the type described in U.S. Published Patent Application No. 2006/0014887 was dissolved at about 25% solids by weight in a mixture of methanol/water (80/20 by wt). Using a pilot-scale coater having three drying zones arranged sequentially in a down-web direction and set to 50° C., 120° C., and 145° C., respectively, the solution of ionomer was coated onto a polyester (PET) liner using a notch bar with a gap of 0.004 inch (about 100 micrometers) and a line speed of about 6 feet (1.8 meters) per minute, with a target dry thickness of 8 micrometers. Immediately after the solution of ionomer was coated onto the polyester liner and before it entered the first drying zone, the leading edge of a web of 25 cm wide 9:1 PES/PVDF nanofiber mat (web) of PE-4 was introduced by hand on top of the coated solution. The 9:1 PES/PVDF nanofiber web was continuously unwound at the same speed as the PET web and the two webs were continuously joined together as new coating solution was applied to the coated polyester film. The sample was then carried through the drying ovens and collected. Properties of the electrolyte membrane so produced are listed in Table 2 (Ex-4).

Working Examples 5-8

A sample of an 825 EW perfluorosulfonic acid ionomer of the type described in U.S. Published Patent Application No. 2006/0014887 was dissolved at about 41% solids by weight in a mixture of methanol/water (80/20 by wt). Using a pilot-scale coater having four drying zones arranged sequentially in a down-web direction and set to 50° C., 65° C., 120° C. and 145° C., respectively, the solution of ionomer was coated onto a polyimide (KAPTON, available from DuPont) liner using a fixed gap to control the thickness and a line speed of about 2 meters per minute, with a target dry thickness of about 9 micrometers. Immediately after the solution of ionomer was coated onto the polyester liner and before it entered the first drying zone, the leading edge of a web of 10 cm wide 7:3 PES/PVDF nanofiber mat (web) of PE-5 was introduced to top of the coated solution. The 7:3 PES/PVDF nanofiber web was continuously unwound at the same speed as the PET web and the two webs were continuously joined together as new coating solution of the same ionomer having a solids level of 30% was applied to the coated polyester film using a second slot die station with a dry target of about 5 micrometers. The sample was then carried through the drying ovens and collected. The membrane was subjected to a second heat treatment at 160° C. for about three minutes. The same process was used for PE-6, PE-7, and PE-8 to make membranes Ex-6, Ex-7, and Ex-8. Properties of the electrolyte membrane so produced are listed in Table 2 (Ex-5-8).

Working Example 9

A sample of a 620 EW perfluorosulfonic imide acid (PFIA) ionomer of the type described in U.S. Provisional Patent Application Ser. No. 61/325,062 was dissolved at about 17% solids by weight in a mixture of methanol/water (80/20 by wt). Using a pilot-scale coater having four drying zones arranged sequentially in a down-web direction and set to 50° C., 65° C., 120° C. and 145° C., respectively, a fiber mat of PE-5 (7:3 PES/PVDF) was pre-wet with methanol and then applied to a polyimide (available from DuPont under the trade designation KAPTON) liner. Next, the solution of PFIA ionomer was coated on top of the fiber mat using a slot die. The line speed was about 2 meters per minute, and the target dry thickness of the composite membrane was about 15 micrometers. The sample was then carried through the drying ovens and collected. The membrane was subjected to a second heat treatment at 160° C. for about 3 minutes. Properties of the electrolyte membrane so produced are listed in Table 2 (Ex-9).

Comparative Example (CE)—Electrolyte Membrane with no Nanofiber Mat

A sample of an 825 EW perfluorosulfonic acid ionomer of the type described in U.S. Published Patent Application No. 2006/0014887, having about 3.5% of the acid groups neutralized with manganese cations, was dissolved at about 20% solids by weight in a mixture of n-propanol/water (50/50 by wt). Using a pilot-scale coater having three drying zones arranged sequentially in a down-web direction and set to 50° C., 100° C., 120° C., and 145° C., respectively, the solution of ionomer was coated onto a polyester liner using a notch bar with a gap of 0.004 inch (about 100 micrometers) and a line speed of about 6 feet (1.8 meters) per minute, with a target dry thickness of 8 micrometers. The sample was then carried through the drying ovens and collected. Another layer of the 825 EW perfluorosulfonic acid ionomer solution was coated onto the PES nanofiber mat at the same notch bar gap and drying conditions. Properties of the electrolyte membrane so produced are listed in Table 2 (CE).

TABLE 2

Electrolyte Membrane Data

| Sample | Fiber Type | Coating solvent | Stabilizing additive | Membrane thickness (micrometers) | Linear swell in hot water (100 × ΔL/L) |
|---|---|---|---|---|---|
| Ex-1 | PVDF | NPA/H$_2$O | no | 20 | 8.1% |
| Ex-2 | PVDF | NPA/H$_2$O | yes | 20 | 6.8% |
| Ex-3 | PES | NPA/H$_2$O | yes | 20 | 0.6% |
| Ex-4 | PES/PVDF (9/1) | MeOH/H$_2$O | no | 20 | 7.8% |
| Ex-5 | PES/PVDF (7/3) | MeOH/H$_2$O | no | 16 | 2.2% |
| Ex-6 | PES/PVDF (7/3) | MeOH/H$_2$O | no | 16 | 6.1% |
| Ex-7 | PES/PVDF (7/3) | MeOH/H$_2$O | no | 16 | 4.4% |
| Ex-8 | PES/PVDF (7/3) | MeOH/H$_2$O | no | 16 | 1.4% |
| Ex-9 | PES/PVDF (7/3) | MeOH/H$_2$O | yes | 15 | 2.5% |
| CE | none | NPA/H$_2$O | yes | 20 | 41.7% |

What is claimed is:

1. An electrolyte membrane, comprising:
a first proton conducting polymer reinforced with a nanofiber mat;
wherein the nanofiber mat is made from a nanofiber comprising a fiber material selected from the group consisting of (i) PES, (ii) a PES blend, (iii) PEI, (iv) a PEI blend, (v) PBI, (vi) a PBI blend, (vii) PPO, (viii) a PPO blend, (ix) PEEK, (x) a PEEK blend, (xi) PPES, (xii) a PPES blend, (xiii) PEK, (xiv) a PEK blends, and (xv) combinations thereof, and
wherein the nanofiber has an average diameter no greater than 1000 nm; and
wherein the first proton conducting polymer is selected from the group consisting of highly fluorinated ionomer, perfluorinated ionomer, hydrocarbon ionomer, blends and combinations thereof.

2. The electrolyte membrane of claim 1, wherein the fiber material is PES blended with PVDF.

3. The electrolyte membrane of claim 1, wherein the fiber material comprises at least one of: PES, PEI, PBI, PPO, PEEK, PPES, and PEK blended with a proton conducting polymer.

4. The electrolyte membrane of claim 1, wherein the fiber material is crosslinked.

5. The electrolyte membrane of claim 1, wherein the nanofiber mat has an average basis weight in a range from 3.2 g/m$^2$ to 6.5 g/m$^2$.

6. The electrolyte membrane of claim 1, wherein the electrolyte membrane has a thickness in the range of from about 10 micrometers to about 50 micrometers.

7. The electrolyte membrane of claim 1, wherein the first proton conducting polymer further comprises a stabilizing additive comprising an element selected from the group consisting of Mn and Ce.

8. The electrolyte membrane of claim 7, wherein the first proton conducting polymer comprises a pendant group having the structure selected from the group consisting of:

—OCF$_2$CF$_2$CF$_2$CF$_2$SO$_3$Y,

—OCF$_2$CF(CF$_3$)OCF$_2$CF$_2$SO$_3$Y, and

—CF$_2$SO$_2$N(Z)SO$_2$(CF$_2$)$_3$SO$_3$Y, wherein Y is a hydrogen ion or a cation and Z is a suitable countercation.

9. The electrolyte membrane of claim 8, wherein the first proton conducting polymer has an equivalent weight of 900 or less.

10. The electrolyte membrane of claim 1, wherein the fiber material further comprises a stabilizing additive comprising an element selected from the group consisting of Mn and Ce.

11. A membrane electrode assembly comprising the electrolyte membrane of claim 1.

12. The electrolyte membrane of claim 1, wherein an average thickness of the nanofiber mat is in a range of about 20% to 60% of an average thickness of the electrolyte membrane.

13. The electrolyte membrane of claim 1, wherein the electrolyte membrane comprises the nanofiber mat in a central layer region with a proton conducting polymer layer on either side and wherein the center layer region is smaller than the proton conducting polymer layer.

14. The electrolyte membrane of claim 1, wherein nanofibers in the nanofiber mat are not fused together.

15. The electrolyte membrane of claim 1, wherein the nanofiber mat is made from a nanofiber comprising a fiber material selected from the group consisting of (i) PES, (ii) PEI, (iii) (v) PBI, (iv) PPO, (v) PEEK, (vi) PPES, (vii) PEK, and (viii) combinations thereof.

16. A multilayer electrolyte membrane comprising:
the electrolyte membrane of claim 1, further comprising at least one layer of a second proton conducting polymer adhered to a major surface of the electrolyte membrane, wherein the second proton conducting polymer is selected from the group consisting of highly fluorinated ionomer, perfluorinated ionomer, hydrocarbon ionomer, blends and combinations thereof.

17. A membrane electrode assembly comprising the multilayer electrolyte membrane of claim 16.

18. A method of making an electrolyte membrane, comprising:
(a) providing a nanofiber mat comprising a nanofiber comprising a fiber material, wherein the fiber material comprises a polymer selected from the group consisting of (i) PES, (ii) PES blends, (iii) PEI, (iv) PEI blends, (v) PBI, (vi) PBI blends, (vii) PPO, (viii) PPO blends, (ix) PEEK, (x) PEEK blends, (xi) PPES, (xii) PPES blends, (xiii) PEK, (xiv) PEK blends, and (xv) combinations thereof, wherein the nanofiber has an average diameter no greater than 1000 nm; and
(b) at least partially filling the nanofiber mat with a first proton conducting polymer, wherein the first proton conducting polymer is selected from the group consisting of highly fluorinated ionomer, perfluorinated ionomer, hydrocarbon ionomer, blends and combinations thereof.

19. The method of claim 18 further comprising applying any one of a sizing, a binder, or a polymeric treatment to the nanofiber mat prior to step b).

* * * * *